United States Patent
Scharkowski et al.

(10) Patent No.: US 11,641,098 B1
(45) Date of Patent: May 2, 2023

(54) COOLING SYSTEM FOR BUSBARS

(71) Applicant: Auto-Kabel Management GmbH, Hausen i.W. (DE)

(72) Inventors: Oliver Scharkowski, Guben (DE); Jens Dören, Jülich (DE); Martin Schloms, Aachen (DE)

(73) Assignee: Auto-Kabel Management GmbH, Hausen i.W. (DE)

( * ) Notice: Subject to any disclaimer, the term of this patent is extended or adjusted under 35 U.S.C. 154(b) by 0 days.

(21) Appl. No.: 17/920,212

(22) PCT Filed: Mar. 29, 2021

(86) PCT No.: PCT/EP2021/058089
§ 371 (c)(1),
(2) Date: Oct. 20, 2022

(87) PCT Pub. No.: WO2021/213780
PCT Pub. Date: Oct. 28, 2021

(30) Foreign Application Priority Data

Apr. 24, 2020 (DE) .................. 10 2020 111 189.4

(51) Int. Cl.
*H01M 10/613* (2014.01)
*H01M 10/6551* (2014.01)
*H01M 10/6553* (2014.01)
*H02G 5/10* (2006.01)

(52) U.S. Cl.
CPC ............ *H02G 5/10* (2013.01); *H01M 10/613* (2015.04); *H01M 10/6551* (2015.04); *H01M 10/6553* (2015.04)

(58) Field of Classification Search
CPC .. H02G 5/10; H01M 10/613; H01M 10/6551; H01M 10/6553
See application file for complete search history.

(56) References Cited

U.S. PATENT DOCUMENTS

| | | | |
|---|---|---|---|
| 2011/0305935 A1* | 12/2011 | Yoon ................ | H01M 10/6554 429/120 |
| 2013/0164595 A1* | 6/2013 | Takase .............. | H01M 10/6554 429/120 |
| 2013/0280574 A1* | 10/2013 | Kim ................. | H01M 10/6553 429/120 |
| 2018/0261992 A1* | 9/2018 | Bower .............. | H01M 50/512 |
| 2019/0348646 A1 | 11/2019 | Rangwala | |
| 2019/0379093 A1* | 12/2019 | Choi ................ | H01M 10/6556 |
| 2020/0136326 A1* | 4/2020 | Rai ................. | H01H 50/12 |

FOREIGN PATENT DOCUMENTS

| | | |
|---|---|---|
| DE | 102014001975 A1 | 8/2015 |
| DE | 102015010989 A1 | 3/2016 |
| DE | 102016109931 A1 | 11/2017 |
| DE | 102017129249 A1 | 6/2019 |
| DE | 102018108003 A1 | 10/2019 |
| EP | 2654101 A1 | 10/2013 |
| JP | 2020017395 A | 1/2020 |

OTHER PUBLICATIONS

German Patent Office, Office Action issued in application DE 102020111189.4 dated Feb. 25, 2021, 6 pages.
European Patent Office, International Search Report and Written Opinion for PCT application PCT/EP2021/058089 dated May 31, 2021, with English translation of ISR, 18 pages.

* cited by examiner

*Primary Examiner* — Muhammad S Siddiquee
(74) *Attorney, Agent, or Firm* — Sunstein LLP

(57) ABSTRACT

Cooling system for bus bars, in particular cell connectors or module connectors of batteries, comprising a bus bar with a first connection area for a pole of a first battery, a second connection area for a connection of an electrical component, an insulation encasing the bus bar between the connection areas, wherein the bus bar is free of the insulation at least in the two connection areas, characterized in that on a side facing away from the pole of at least one of the connection areas, a gel-shaped heat conducting agent is applied directly to the surface of the bus bar.

10 Claims, 4 Drawing Sheets

COOLING SYSTEM FOR BUSBARS

CROSS-REFERENCE TO RELATED APPLICATIONS

This application is the national phase entry of international patent application no. PCT/EP2021/058089 filed Mar. 29, 2021 and claims the benefit of German patent application No. 10 2020 111 189.4 filed Apr. 24, 2020, the disclosures of which are incorporated herein by reference in their entirety.

TECHNICAL FIELD

The subject matter relates to a cooling system for busbars, in particular for busbars used as cell connectors or module connectors of batteries, especially in automotive applications.

BACKGROUND ART

Bus bars are increasingly used in automotive applications. Bus bars have the advantage that they have a good current-carrying capacity and can be fitted very well into existing installation spaces. Bus bars are used in particular for cables that must have a high current-carrying capacity. Such cables are formed with conductor cross-sections of over 16 $mm^2$, preferably up to 250 $mm^2$ and more. Depending on the application, the busbars have a current carrying capacity of 100A to several 100A, which leads to high ohmic losses even with high conductivities of the busbars.

The ohmic losses lead to Joule heat, which must necessarily be dissipated to protect the conductors from damage. However, the disadvantage here is that, due to the need for electrical safety, the busbars are usually surrounded by an electrical insulator, which is also a thermal insulator.

If the joule heat is to be dissipated only by convection, this is particularly problematic if a bus bar of the present type is used in a narrow housing, such as a battery or battery module.

The subject matter was therefore based on the object of improving the durability of busbars when used in high-current lines.

SUMMARY OF THE INVENTION

A bus bar of the present invention is formed, for example, from aluminum or an aluminum alloy or copper or a copper alloy. The bus bar generally has an angular conductor cross-section, in particular a square or rectangular conductor cross-section. The bus bar can be formed as a flat part and, for example, be cut or stamped from a sheet or strip or extruded from a starting material.

The field of application of a bus bar of the present invention lies in particular in automotive applications. This can be in particular the use in the connection of batteries, be it traction batteries, support batteries or other batteries in the vehicle. Batteries in the present sense can be battery cells that are interconnected. A single cell, for example a lithium-ion cell, is connected in parallel and/or in series with a plurality of other cells to form a battery module. Within a battery module, a plurality of cells are each encapsulated in a common housing. The individual cells can be connected to each other via a busbar in the present sense.

Batteries in this sense may also be battery modules. A busbar according to the subject matter may be formed to connect battery modules to each other or to connect a battery module to an electrical load or a connector. As mentioned above, a plurality of battery cells are combined to form a battery module. Each individual module may be enclosed in its own housing. A plurality of modules may in turn be enclosed in their own housing. The modules are connected to each other in series and/or in parallel. The modules may be connected to each other or to further elements by means of a subject busbar.

In addition, it is also possible for a busbar according to the subject matter to be used as a so-called "Energy Backbone®", in particular for the connection between a drive battery and an electric motor. Such a busbar can, for example, also be guided in a housing, for example a cable duct. A cable duct may be prescribed in particular to increase electrical safety.

In all these applications mentioned, the busbar is subjected to high electrical loads during operation. Currents of 100A and more flow through the busbar. These high currents lead to high ohmic losses and thus to high Joule heat that must be dissipated.

The current busbar is connected to at least one terminal of a battery cell or module by a first connection area. In the case of a cell connector, the bus bar is connected with a second connection area to a pole of a second battery cell. In the case of a module connector, the bus bar is connected with a second connection area to a pole of a second battery module or to an electrical connection part. In this case, the busbar may be connected as an "energy backbone" with its second connection area to an electrical contact area of, for example, an electrical component, an electric motor, a comfort consumer in a vehicle or the like.

The first and second connection areas of the busbar are preferably located at distal ends of the busbar. In particular, the connection areas are located on the wide surfaces of the bus bar, which are enclosed by a front edge and two opposing longitudinal edges of the bus bar. The bus bar is connected with its connection areas to the battery and/or the contact area in a conventional manner. In particular, screw connections, clamp connections, soldered connections, welded connections, in particular ultrasonic welded connections, friction stir welded connections, resistance welded connections or the like are used.

Between the connection areas, the busbar is at least partially sheathed with an insulator. The insulator is preferably PE, PVC or silicone.

To improve heat dissipation, in particular to increase heat dissipation compared to pure convection in air, it is proposed that on a side facing away from the pole of at least one of the connection areas, a gel-shaped heat conductor is applied directly to the surface of the busbar. Gel-like in the present sense can also mean pasty. The thermal conductive agent has an increased thermal conductivity compared to air and results in Joule heat being dissipated from the busbar. Preferably, the thermal conductive agent is applied in such a way that the absorbed Joule heat can be dissipated to the environment over a larger surface area than the surface area on which it is applied to the busbar.

According to an embodiment, it is proposed that the thermal conductive agent has a viscosity between 25 Pas and 130 Pas.

According to an embodiment, it is proposed that the thermal conductive agent has an increased thermal conductivity compared to air, at least double or triple the thermal conductivity of air. It is further also proposed that the thermal conductivity is between 2 W/mK and 12 W/mK. It has been found that a thermal conductivity of 6 W/m K is particularly advantageous for the present applications, as this is sufficient to adequately dissipate the Joule heat generated.

Heat dissipation can be passive or active. In the case of passive heat removal, the heat conducting agent is connected to a passive heat exchanger. According to an embodiment example, it is proposed that the heat conducting means is in direct contact with a passive heat exchanger. In particular, the heat conducting means is sandwiched between the bus bar and the heat exchanger. For example, during assembly of a housing, for example a modular connector, it is possible to apply the heat conducting agent to the busbar and then to close the housing, the heat exchanger being pressed against the heat conducting agent by the closure.

According to one embodiment, the heat exchanger may be a housing wall or a portion of a housing wall. A housing wall may also be a housing cover.

According to an embodiment, it is proposed that the battery cells or battery modules are encapsulated in a common housing and that at least one housing wall is in direct contact with the heat conducting agent. It is possible to use the housing or a housing wall itself as a passive heat exchanger. It is proposed that at least one housing wall is in direct contact with the heat conducting agent when the housing is assembled. It is then possible to transfer the heat absorbed by the busbar to the housing wall via the heat-conducting agent. From the housing wall, the heat can then be dissipated out of the housing to the environment.

To increase the thermal conductivity out of the housing, it is proposed that the housing be formed of a metallic material in the region where its wall is in direct contact with the heat conducting agent. The heat conducting agent itself may be an electrical insulator. In that case, the heat conducting means provides insulation between the terminal area of the bus bar and the housing. However, in order to transport Joule's heat to the outside of the housing, it has been found to be advantageous if at least a region of the housing that is in direct contact with the heat conducting means is formed of a metallic material. Metallic materials have good thermal conductivity, so that with these the dissipated thermal energy can be transported particularly well to the outside of the housing.

In order to allow good convection on the outside of the housing, it is proposed that a fin-shaped heat sink is arranged on the housing wall that is in direct contact with the heat-conducting agent. Such a heat sink has a structure that has a particularly large surface area for a given volume, so that a particularly large amount of thermal energy can be dissipated to the air via the surface area.

According to an embodiment, it is proposed that the heat conducting agent is guided through a housing opening to the outside of the housing. The housing may have a recess and through this recess the heat conducting agent may be guided from the inside to the outside. On the outside of the housing, for example, a large-area region may be coated with heat-conducting agent, this region being larger than the region in which the heat-conducting agent is in contact with the busbar. Then the heat-conducting agent itself can act as a passive heat sink. Since the heat-conducting agent is electrically insulating, it electrically seals the housing. The heat conducting agent itself thus forms the heat sink on the outside of the housing.

According to one embodiment, it is proposed that active cooling is provided. For this purpose, it is proposed that a piping with a liquid or gaseous cooling medium is introduced into the housing. The introduction into the housing can thereby be gas-tight and/or liquid-tight, so that the batteries/cells installed in the housing are protected from environmental influences. Within the housing, the piping directly bypasses the heat conducting agent. This means that the piping, in particular the outer jacket surface of the piping, is in direct contact with the heat conducting agent. The piping can also be guided through the heat-conducting agent. The cooling medium flowing through the piping absorbs thermal energy from the heat-conducting agent and conducts it to the outside of the housing. The cooling medium is circulated in the piping and is led outside the housing to an active heat exchanger. An exchange of thermal energy can take place at the heat exchanger so that thermal energy can be conducted out of the housing by means of the cooling medium.

As explained earlier, the bus bar may be a battery module connector. In this case, the first pole may be a pole of a first battery module having a plurality of battery cells electrically connected in parallel and the second pole may be a pole of a second battery module having a plurality of battery cells electrically connected in parallel.

It may be necessary to dissipate further thermal energy as the busbar progresses. For this reason, it is proposed that the busbar has an area between the two connection areas as a connection area and/or cooling area, in which area the insulation is removed and the thermal conductive agent is applied directly to the area. The thermal conductive agent as well as the arrangement of the thermal conductive agent in, on and outside the housing can be according to the above.

For electrical insulation, it is suggested that the thermal conductive agent has an electrical conductivity of less than 10-8 S/m.

BRIEF DESCRIPTION OF THE DRAWINGS

In the following, the subject matter is explained in more detail with reference to drawings showing embodiments. The drawings show.

DETAILED DESCRIPTION OF SPECIFIC EMBODIMENTS

Figure 1:
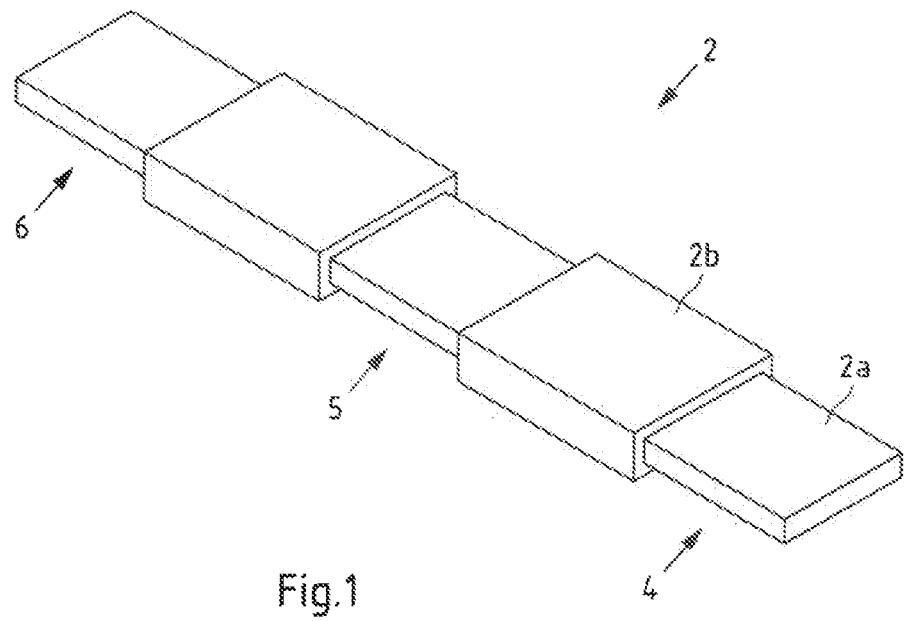
FIG. 1 a busbar according to an embodiment.

FIG. 1 shows a bus bar 2. The bus bar 2 is formed as a flat conductor with a conductive conductor core 2a and an insulation 2b surrounding the core.

It can be seen that the bus bar 2 has a rectangular conductor profile with two opposite wide surfaces, two opposite narrow surfaces, and two opposite end surfaces. The surfaces preferably extend parallel to each other, and the wide and narrow surfaces may extend parallel to each other in the longitudinal direction and the end surfaces may extend parallel to each other transversely to the longitudinal direction.

The bus bar 2 is formed by sections in which the conductor core 2a is free of the insulator 2b and sections in which the insulator 2b surrounds the conductor core 2a. Due to the insulator 2b, heat dissipation by convection at the surface of the bus bar 2 is impeded. This is particularly relevant when the bus bar 2 is used for high current applications. In this case, the conductor core 2a with its connection areas 4, 6, which are located, for example, at respective distal ends of the bus bar 2 in the area of the end faces, is freed from the insulation 2b and connected to poles of a battery, as will be shown below.

Figure 2A:
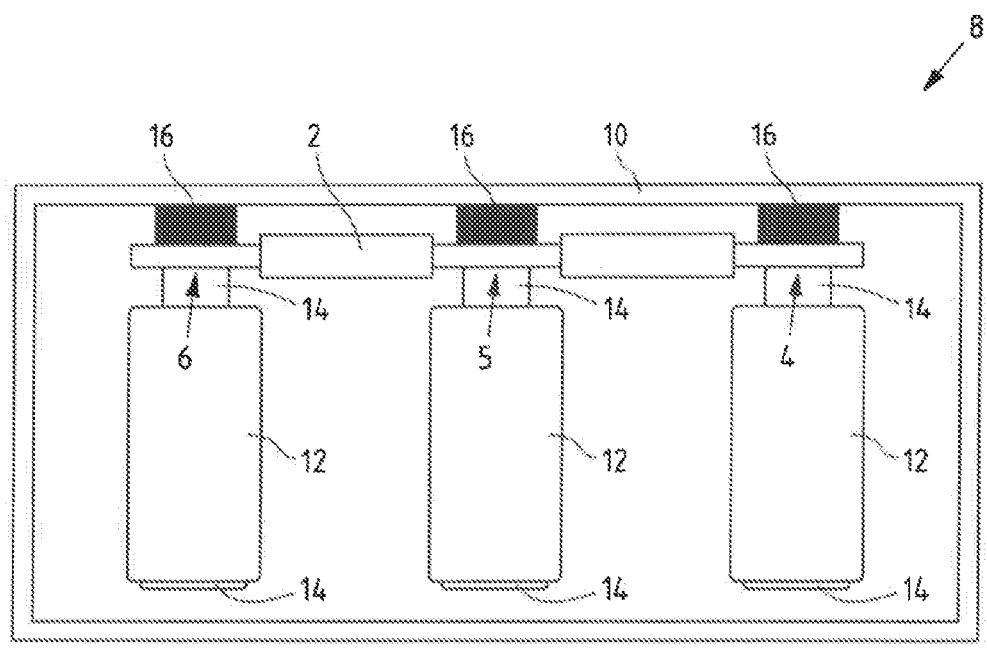
FIG. 2a, b cooling system according to an embodiment.

FIG. 2a shows a battery 8 with a housing 10. Battery cells 12 are arranged side by side within the housing 10. The battery cells 12 have respective terminals 14.

In a cooling system of the present invention, a busbar 2 with its connection areas 4, 6 is connected to a respective pole 14 of the battery cells 12, in particular by a material bond. In addition to the connection areas 4, 6, the busbar 2 may have further areas in which the insulator 2b is removed, this being, for example, a central connection area 5 of the busbar 2.

When the bus bar 2 conducts the currents of the battery cells 12, high currents may occur and the bus bar 2 may heat up. In order to be able to dissipate the generated joule heat, it is proposed that a heat conductive agent 16 is applied directly to the bus bar in the respective connection areas 4, 5, 6. The thermal conductive agent 16 may be gel-like or paste-like. At operating temperature, for example between −10° C. and +70° C., the heat-conducting agent 16 has a non-liquid viscosity and is thus dimensionally stable.

The thermal conductive agent 16 is applied to the conductor core 2a in the connection areas 4, 5, 6 on the surface facing away from the respective poles 14. Via the heat conducting agent 16, the Joule heat can be transported away from the bus bar 2 and, in particular, into the housing 10 or out of the housing 10.

Figure 2B:
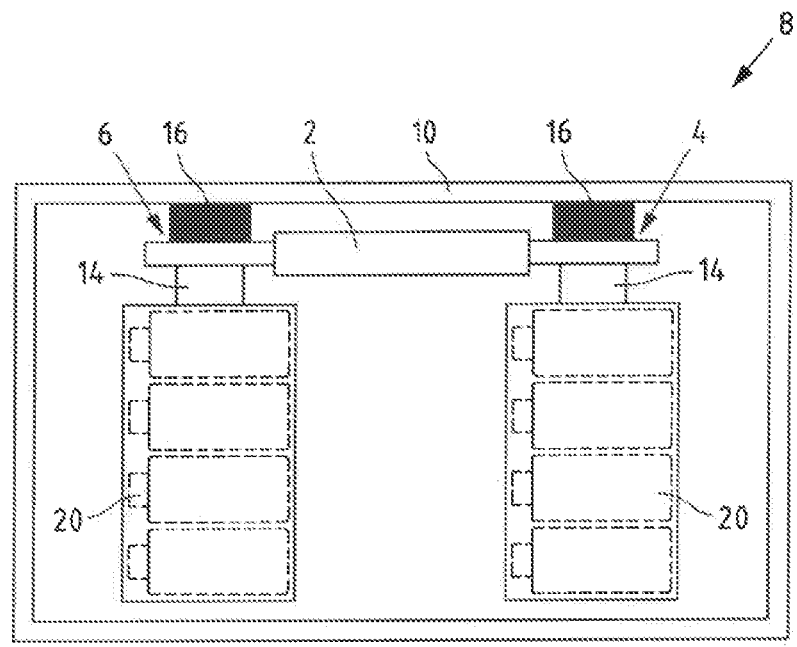

FIG. 2b shows another embodiment of a battery 8 with a housing 10. Here, the battery 8 is formed of battery modules 20, each having at least one terminal 14. It is also possible, but not shown, that only one pole 14 of a battery module 20 is provided and the bus bar 2 is led out of the housing 10 and is connected to another electrical conductor, for example.

The bus bar 2 is connected to a connection area 6 having a pole 14 and a connection area 4 having a pole 14. It is also possible that the connection area 4 is connected to a connection of a further electrical device, a cable or the like.

On the respective opposite side of the conductor core 2a, on which the conductor core 2a is not connected to the pole 14 or the further electrical component, the heat conducting agent 16 is applied in the present case. According to FIG. 2b, the heat conducting agent 16 is in direct contact on the one hand with the conductor core 2a and on the other hand with the inner wall of the housing 10. Heat can be transported from the conductor core 2a to the housing 10 via this.

Figure 3:
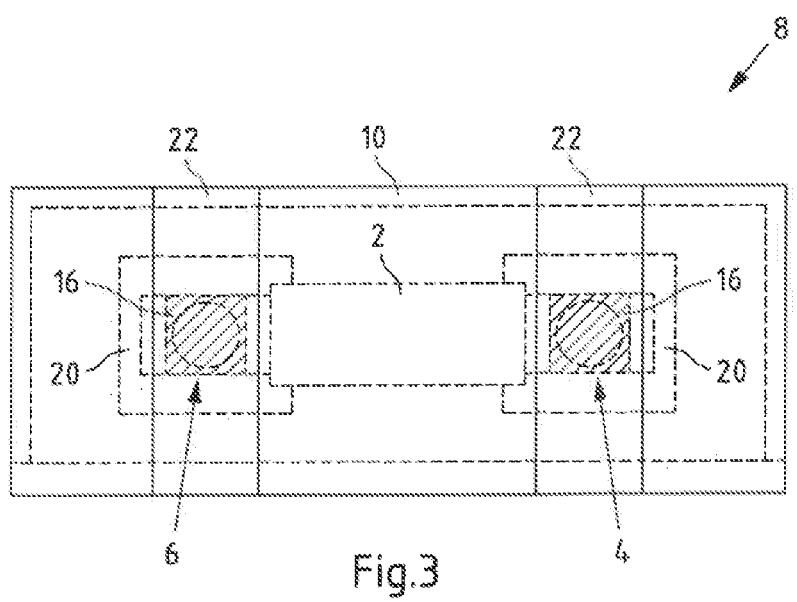
FIG. 3 a top view of a battery housing.

FIG. 3 shows a top view of a housing 10, in particular a housing cover. It can be seen that the shown housing wall of the housing 10 has various areas, wherein areas are provided in which a heat conducting material is embedded in the housing wall. This heat conducting material may be metallic, for example. In particular, the housing wall may be perforated by a metallic strip 22. The metallic strip 22 may extend across the width and/or length of the housing wall of the housing 10. The metallic strip 22 is in direct contact on the inner side of the housing 10 with the heat conducting material 16, which is in direct contact on the other side with the connection areas 4, 6 of the busbar 2.

The heat conducting material 16 is electrically non-conductive and forms an insulator between the pole 14 and the metallic strip 22. Via the metallic strip 22, in particular, a good heat transfer from the inside of the housing 10 to the outside of the housing 10 can take place.

Figure 4:
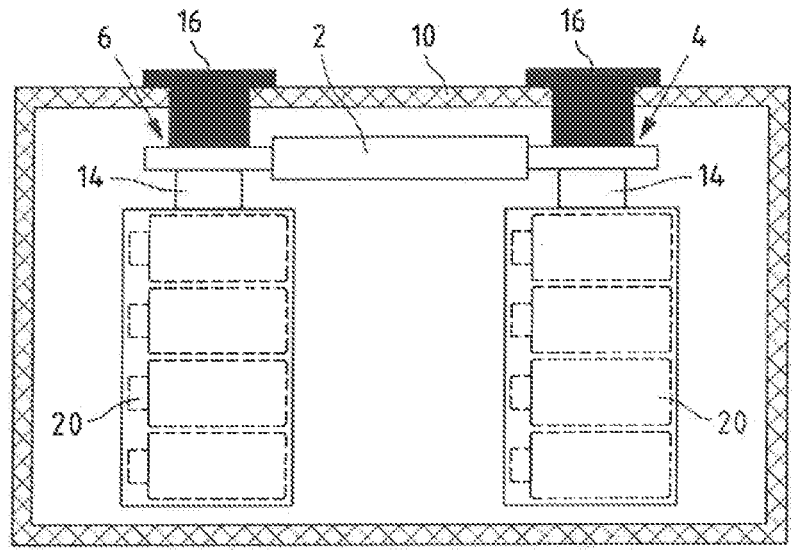
FIG. 4 a section through a housing cover of a battery according to an embodiment.

As shown in FIG. 4, it is also possible for the busbar 2 to be in direct contact with the heat conducting means 16 with its connection areas 4, 6 inside the housing 10. The heat conducting means 16 is arranged on the side of the connection areas 4, 6 facing away from the poles 14. The heat conducting agent 16 is guided through the housing wall of the housing 10, for example a recess, as shown in FIG. 4. Thus, the heat conducting agent 16 is guided from the interior of the housing 10 to the exterior of the housing 10.

On the outside of the housing 10, the heat-conducting agent 16 can be applied over a large area, for example, in particular over an area that is larger than the recess in the housing wall of the housing 10 through which the heat-conducting agent 16 is guided to the outside. Good heat transfer can be achieved via this enlarged surface area.

Figure 5:
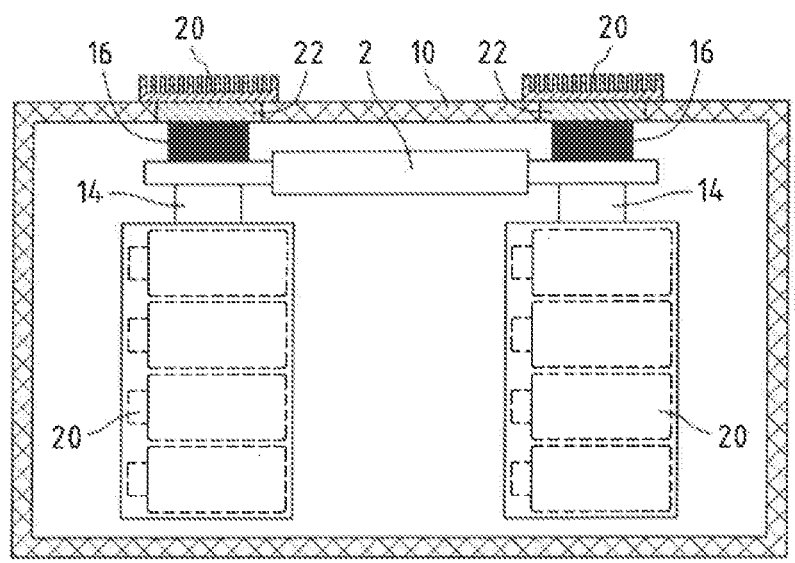
FIG. 5 a section through a cover of a housing of a battery according to an embodiment.
Figure 6:
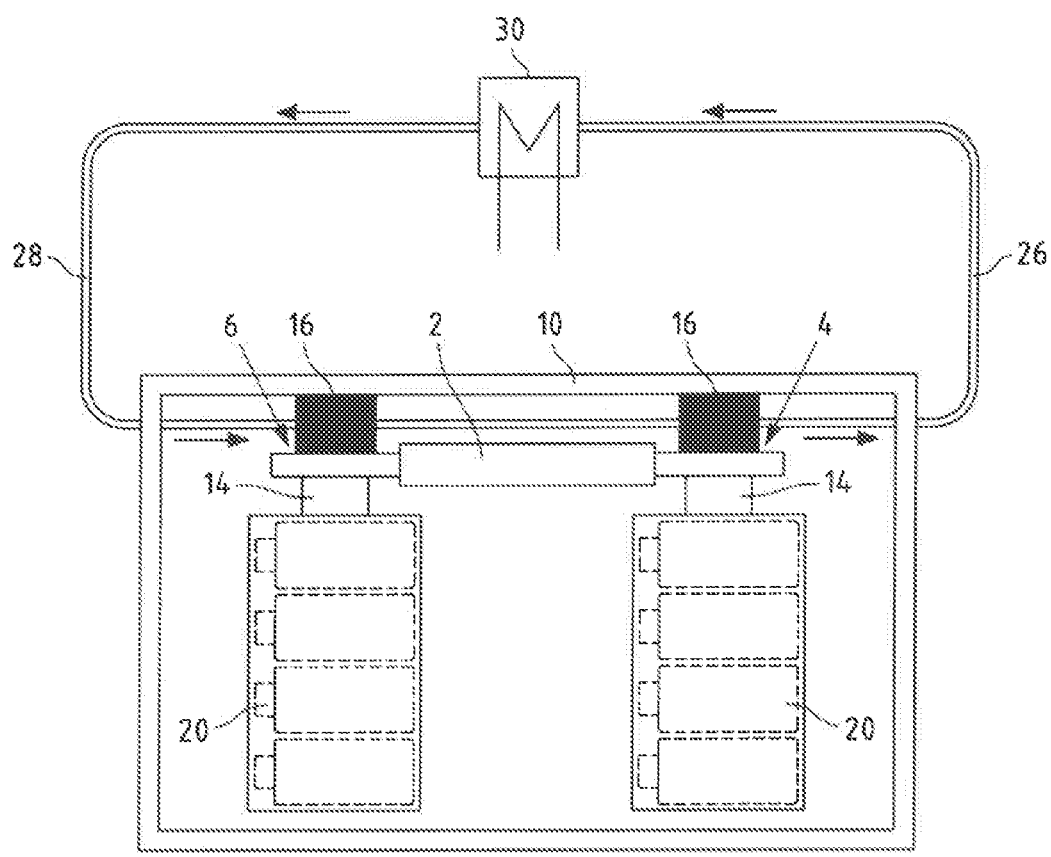
FIG. 6 a schematic view of an active cooling system according to an embodiment.

FIG. 5 shows another embodiment in which the busbar 2 inside the housing 10 is in direct contact with the pole 14 and the heat conducting agent 16. The metallic bands 22 in the housing wall of the housing 10 connect the heat conducting agent 16 to the outside of the housing 10. On the outside of the housing 10, a heat sink 24, for example a fin-shaped heat sink 24, can be arranged directly on the metallic bands 22, via which convection is possible.

It is also possible that a so-called "heat pipe" 26 is guided inside the housing 10. The heat pipe 26 is guided into the interior of the housing 10 in a sealed manner. In the heat pipe 26 is a refrigerant which flows in flow direction 28 through the heat pipe 26. The flow direction 28 can be influenced by a motor with heat exchanger 30. At the motor/heat exchanger 30, heat is extracted from the refrigerant and released to the environment.

Inside the housing 10, the heat conduction medium 16 is provided on the busbar 2 in the connection areas 4, 6 respectively. The heat pipe 26 can be guided through the heat conduction medium 16 or directly adjacent to the heat conduction medium 26 in the housing 10. Through the refrigerant in the heat pipe 26, the heat can be transported from the heat conducting agent 16 from the inside of the housing 10 to the outside, where it can be exchanged with the environment via the heat exchanger 30.

With the aid of the solution shown, it is possible to dissipate Joule heat from bus bars used to connect battery cells or battery modules particularly effectively.

List of Reference Signs
2 busbar
2a conductor core
2b insulator
4, 5, 6 connection area
8 battery
10 housing
12 battery cell
14 battery terminal
16 heat conductor
20 battery module
22 metal strip
24 heat sink
26 heat pipe
28 flow direction
30 motor/heat exchanger

What is claimed is:

1. Cooling system for bus bars, in particular cell connectors or module connectors of batteries, comprising
   a busbar with
      a first connection area for a pole of a first battery,
      a second connection area for a connection of an electrical connection part,
      an insulation sheathing the busbar between the connection areas, wherein the busbar is free of the insulation at least in the two connection areas, wherein on a side facing away from the pole of at least one of the connection areas, a gel-shaped heat-conducting agent is applied directly to the surface of the busbar;

wherein the heat conducting agent is guided through a housing opening to the outside of a housing and the bus bar comprises a cooling region between the two connection regions, wherein the insulation is removed in the cooling region and the heat conducting agent is applied directly to the cooling region.

2. Cooling system according to claim 1, wherein the heat-conducting agent has a viscosity of between $1*10^6$ mPas and $1*10^{12}$ mPas.

3. Cooling system according to claim 1, wherein the heat-conducting agent has a thermal conductivity between 5 W/mK and 12 W/mK, in particular in the range of 8 W/mK.

4. Cooling system according to claim 1, wherein the heat conducting agent is in direct contact with a passive heat exchanger, in particular that the heat conducting agent is clamped between the busbar and the heat exchanger.

5. Cooling system according to claim 1, wherein the batteries are enclosed in a common housing and that at least one housing wall is in direct contact with the heat conducting agent.

6. Cooling system according to claim 1, wherein the housing in the region in which its wall is in direct contact with the heat-conducting agent is formed from a metallic material.

7. Cooling system according to claim 6, wherein a fin-shaped heat sink is arranged on the housing wall which is in direct contact with the heat-conducting agent.

8. Cooling system according to claim 1, wherein a piping with a liquid or gaseous cooling medium is guided into the housing, that the piping is guided in the housing directly along the heat-conducting agent, and that the piping is guided outside the housing into an active heat exchanger.

9. Cooling system according to claim 1, wherein the first pole is a pole of a first battery module having a plurality of battery cells electrically connected in parallel, and that the second pole is a pole of a second battery module having a plurality of battery cells electrically connected in parallel.

10. Cooling system according to claim 1, wherein the heat conducting agent has an electrical conductivity of less than $10^{-8}$ S/m.

\* \* \* \* \*